Sept. 10, 1968          P. D. COREY ET AL                3,401,329
                   BUCK AND BOOST VOLTAGE REGULATOR
Filed Feb. 12, 1965                              3 Sheets-Sheet 1
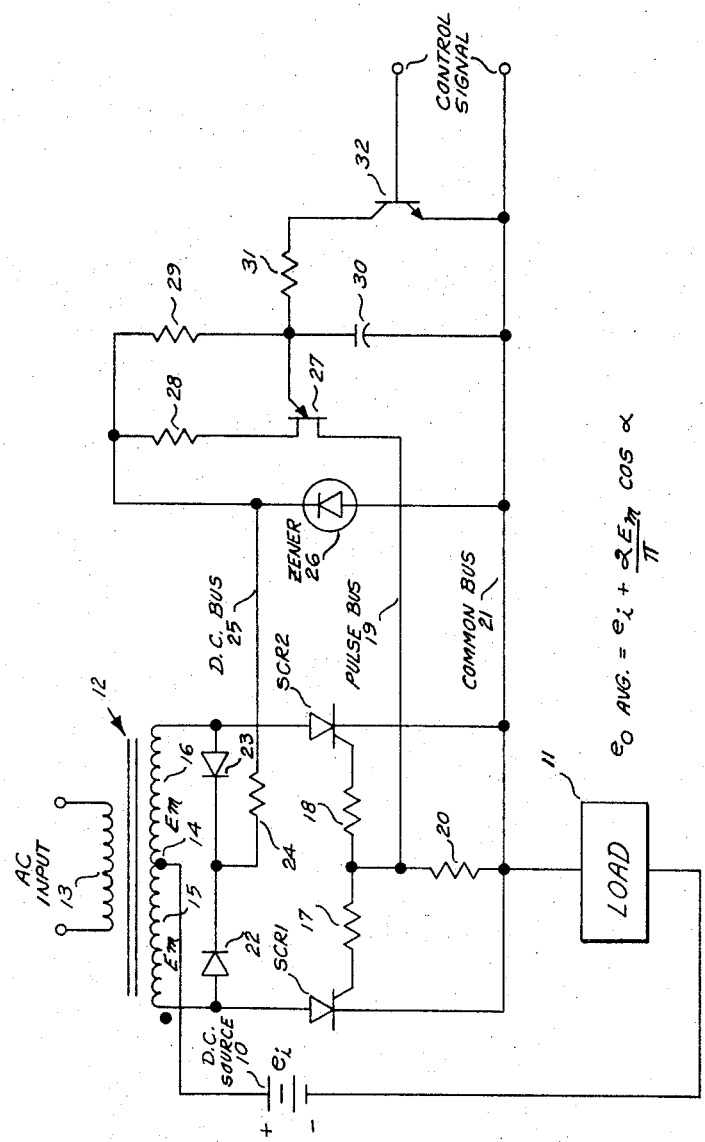
INVENTORS
PHILIP D. COREY
DENNIS A. PORTER
BY *James G. Williams*
THEIR ATTORNEY

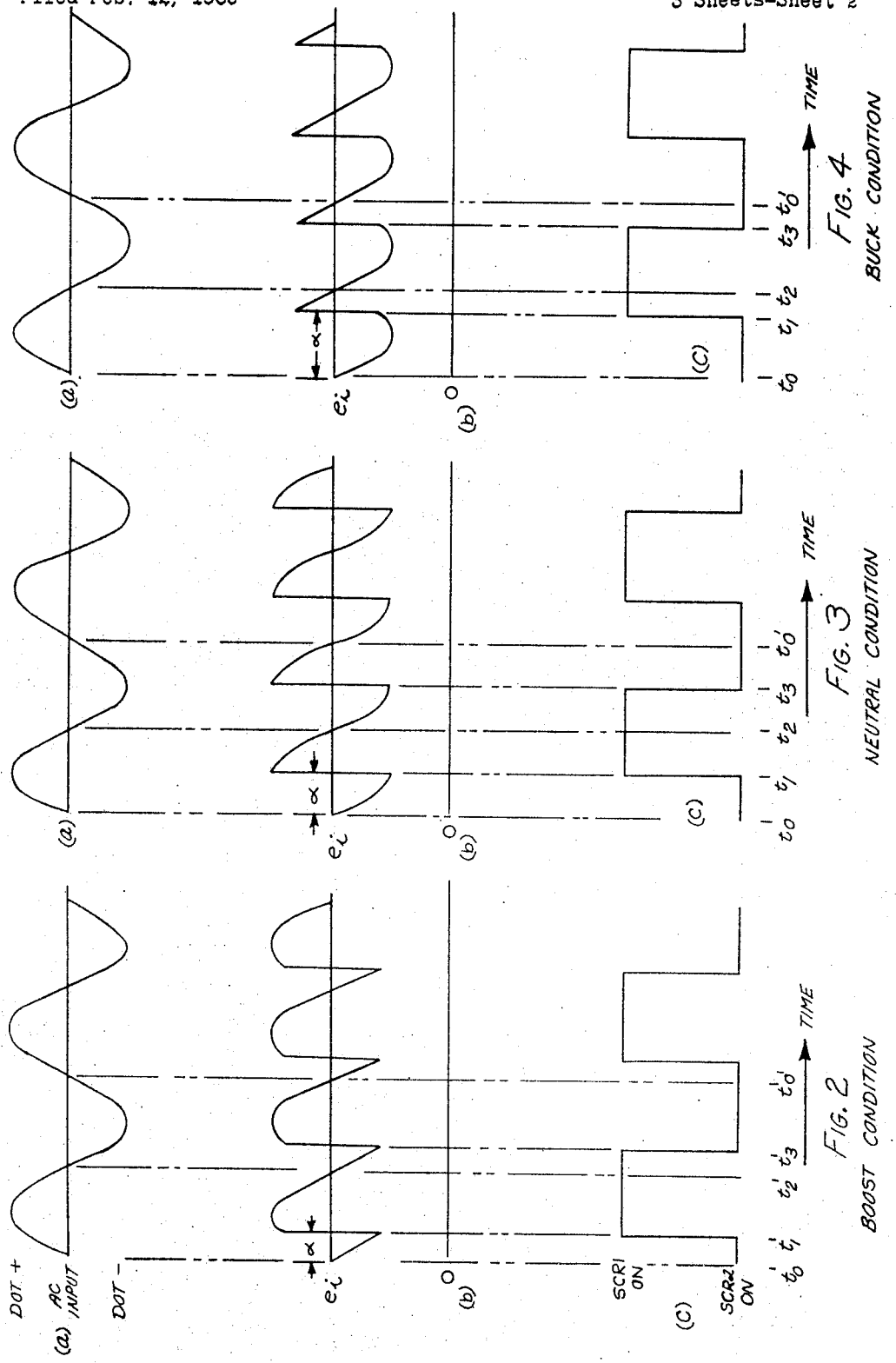

Sept. 10, 1968 P. D. COREY ET AL 3,401,329
BUCK AND BOOST VOLTAGE REGULATOR
Filed Feb. 12, 1965 3 Sheets-Sheet 3

INVENTORS
PHILIP D. COREY
DENNIS A. PORTER
BY James J. Williams
THEIR ATTORNEY

United States Patent Office 3,401,329
Patented Sept. 10, 1968

3,401,329
BUCK AND BOOST VOLTAGE REGULATOR
Philip D. Corey, Crozet, and Dennis A. Porter, Crimora, Va., assignors to General Electric Company, a corporation of New York
Filed Feb. 12, 1965, Ser. No. 432,163
7 Claims. (Cl. 323—18)

ABSTRACT OF THE DISCLOSURE

A buck and boost voltage regulator is provided in which a pair of SCR's couple AC and DC voltage to a load. The SCR's are controlled to conduct alternately at a selected phase angle in each half cycle of the AC voltage. The phase angle is selected so that the average AC voltage is either positive, negative or zero to add to, subtract from or not affect the DC voltage.

Figure 5:
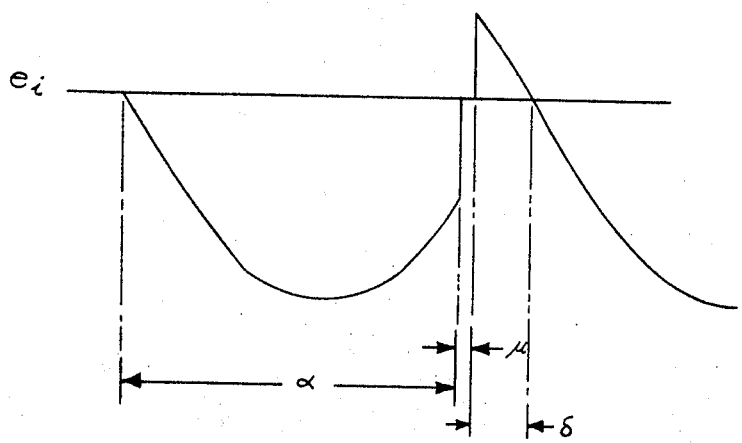

The invention relates to a voltage regulator, and particularly to a voltage regulator for regulating the voltage of a variable direct current source.

In some electrical systems, direct current sources are available, but the loads require alternating current. One common way to convert direct current to alternating current is to use an inverter. A typical inverter may use controlled rectifiers coupled to the direct current source and switched so as to produce an alternating current. In such inverters, the stability of the alternating current frequency and voltage is dependent, in part, on the stability or regulation of the direct current source voltage.

Accordingly, an object of the invention is to provide a new and improved voltage regulator for direct current sources.

Another object of the invention is to provide a new and improved regulator that regulates direct current voltage to be supplied to an inverter by using the alternating current output voltage of the inverter.

Many electrical circuits, such as the inverter mentioned, use static circuit elements. Static elements may be desirable because they require no maintenance, and they can operate under a wide range of conditions. When static elements are used, it is desirable that they be used under maximum conduction angle conditions because such operation minimizes losses for handling any given output power level, and therefore results in considerable economy, compared to previous circuits which operate at variable and reduced conduction angles.

Accordingly, another object of the invention is to provide a new and improved direct current voltage regulator having static circuits elements which constantly operate under maximum conduction angle conditions.

Briefly, these and other objects are achieved in accordance with the invention by the insertion of a selected angular portion of an alternating current voltage in series with the direct current voltage to be regulated. The selected angular portion is inserted for each half cycle of the alternating current voltage, and each inserted portion has the same sense relative to the direct current voltage. As the selected portions vary, they add to and subtract from the direct current voltage. The selected portion is alternatively inserted through two current control devices at a particular time relative to each half cycle of the alternating current voltage. The characteristic of each selected portion determines whether the selected portion predominantly adds to the direct current voltage, or predominantly subtracts from the direct current voltage, or adds and subtracts equally and is thus neutral. The predominant adding of the selected portion raises the average direct current voltage. The predominant subtraction of the selected portion lowers the average direct current voltage. And, a neutral selected portion does not change the average direct current voltage.

Figure 6:
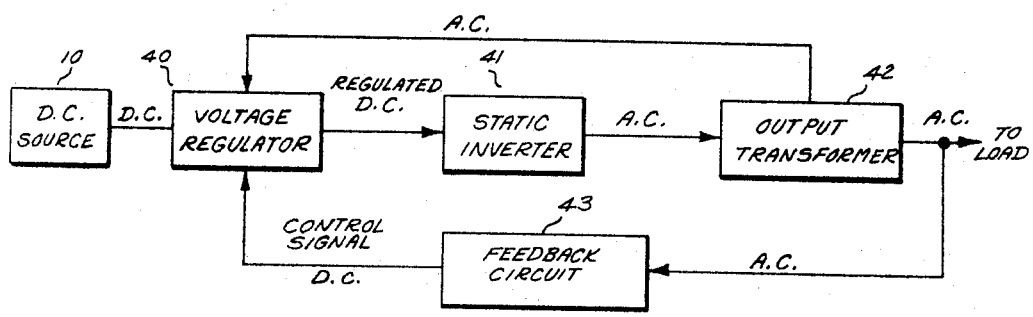

The invention is particularly pointed out in the claims. The invention may be better understood from the following description given in connection with the accompanying drawing, in which:

FIGURE 1 shows a circuit diagram of a preferred embodiment of the voltage regulator of the invention;

FIGURES 2, 3, 4, and 5 show waveforms for explaining the operation of the voltage regulator shown in FIGURE 1; and FIGURE 6 shows a block diagram of the voltage regulator as used in an inverter system.

In FIGURE 1, the direct current voltage to be regulated is supplied from a direct current source 10 that is represented as a battery having positive and negative polarities and having a magnitude $e_1$. The source 10 may be any direct current source whose voltage is to be regulated. The source 10 supplies direct curent to a load 11 which is indicated by a block that may take a number of forms, such as an inverter. The direct current source 10 is supplied to the load 11 through windings 15, 16 of a transformer 12 and through the current paths of current control devices such as silicon controlled rectifiers indicated in FIGURE 1 as SCR1 and SCR2. The controlled rectifiers SCR1, SCR2 are known in the art, and comprise an anode, a cathode, and a gate electrode. The current path of each of the rectifiers SCR1, SCR2 is between the anode and cathode. The transformer 12 includes a primary winding 13 that is coupled to a secondary winding having a center tap 14 that divides the secondary winding into two windings 15, 16. The outside end of the secondary winding 15 is provided with a polarity dot which will be used in explaining the operaiton of the circuit. This end of the secondary winding 15 is coupled to the anode of the controlled rectifier SCR1. Likewise, the outside end of the secondary winding 16 is coupled to the anode of the controlled rectifier SCR2. The gate electrodes of the controlled rectifiers SCR1, SCR2 are coupled to respective resistors 17, 18 which are joined together and coupled to a pulse bus 19. The pulse bus 19 is coupled through a resistor 20 to a common bus 21. This common bus 21 is coupled to one side of the load 11. The cathodes of the controlled rectifiers SCR1, SCR2 are also coupled to the common bus 21. The other side of the load 11 is coupled to the negative terminal of the direct current source 10.

Two diode rectifiers 22, 23 have their anodes respectively coupled to the outside ends of the secondary windings 15, 16 and have their cathodes coupled together. The cathodes are in turn coupled to one end of a resistor 24. The other end of the resistor 24 is coupled to a direct current bus 25 which supplies pulsing direct current to a pulse circuit. The pulse circuit renders the controlled rectifiers SCR1, SCR2 conductive at a desired and predetermined time. The pulse circuit includes a Zener diode rectifier 26 which limits the positive magnitude of the voltage on the direct current bus 25. The pulse circuit also includes a unijunction type transistor 27 which has its upper or second base coupled through a resistor 28 to the direct current bus 25. The lower or first base of the unijunction transistor 27 is coupled to the pulse bus 19. A resistor 29 is coupled between the emitter of the unijuncion transistor 27 and the direct current bus 25; and a capacitor 30 is coupled between the emitter of the unijunction transistor 27 and the common bus 21. A control circuit comprising a resistor 31 and the collector-emitter path of an NPN type transistor 32 is coupled in parallel with the capacitor 30. This control circuit bypasses a controlled amount of current and thus determines the rate at which the capacitor 30 is charged. The amount of current passed by this control circuit is determined by a control signal. The control signal, in turn, may be an error signal indicative of the relative magnitudes of a reference signal and a feedback signal, such as derived from an inverter represented by the load 11. The pulse circuit shown is known in the art, and the lower or first base of the unijunction transistor 27 produces a current pulse at a time determined mainly by the rate at which the capacitor 30 is charged. When the capacitor 30 receives sufficient charge, the unijunction transistor 27 conducts so that a pulse of current is supplied from the upper plate of the capacitor 30 through the emitter and lower or first base of the unijunction transistor 27 to the pulse bus 19. This pulse of current is supplied to the controlled rectifiers SCR1, SCR2 and causes the nonconducting one of the two controlled rectifiers SCR1, SCR2 to conduct or to be turned on, and this in turn causes the conducting one of the two controlled rectifiers SCR1, SCR2 to be cut off.

The operation of the direct current regulator of the invention will be explained in connection with FIGURES 2, 3 and 4. Each of these FIGURES 2, 3 and 4 shows three waveforms respectively plotted along a common time axis. The upper waveform (a) of each of the figures shows the alternating current input signal across the two secondary windings 15, 16 of the transformer 12. The middle waveform (b) shows how a selected portion of this alternating current voltage is inserted or placed in series with the voltage $e_1$ of the direct current source 10. And the lower waveform (c) shows when the controlled rectifiers SCR1, SCR2 are respectively conducting.

The operation of the circuit of FIGURE 1 with respect to the waveforms of FIGURE 2 will be explained first. The waveforms of FIGURE 2 represent the operation of the circuit in the boost condition. That is, the inserted portion of the alternating current source predominantly adds to the voltage $e_1$ of the direct current source 10 so that the average direct current voltage $e_0$ supplied to the load 11 is increased. At the time $t_0$ in FIGURE 2, the dotted end of the secondary winding is beginning to go positive as shown in FIGURE 2(a). It is assumed that the controlled rectifier SCR2 is conducting as indicated in FIGURE 2(c). The voltage across the secondary winding 16 from the center tap 14 to the end is positive to negative. This voltage subtracts from the voltage $e_1$ as indicated in FIGURE 2(b). At the time $t_1$, this being at angle $\alpha$ as shown in FIGURE 2(b), the pulse circuit produces a pulse that causes the controlled rectifier SCR1 to be turned on. When the controlled rectifier SCR1 is turned on, current through the winding 16 and the controlled rectifier SCR2 is diverted through the winding 15 and the controlled rectifier SCR1. Since the dotted end of the winding 15 is positive relative to the center tap 14, the alternating current voltage adds to the voltage $e_1$ of the direct current source 10 as shown in FIGURE 2(b). Also, when the controlled rectifier SCR1 is turned on, it places a reverse voltage across the controlled rectifier SCR2 so that the controlled rectifier SCR2 is turned off. This switching is shown in FIGURE 2(c) at the time $t_1$. This condition of the alternating current voltage adding to the direct current voltage $e_1$ continues until the time $t_2$ when the AC input signal reverses polarity so that the dotted end of the transformer secondary becomes negative. Since the controlled rectifier SCR1 is still conducting, the alternating current voltage opposes or subtracts from the direct current voltage $e_1$.

At the time $t_3$, the pulse circuit produces another pulse which turns the controlled rectifier SCR2 on. This causes current to be diverted from the winding 15 through the winding 16 and through the controlled rectifier SCR2. Since the undotted end of the winding 16 is positive relative to the center tap 14, the alternating current voltage adds to the direct current voltage $e_1$. When the controlled rectifier SCR2 is turned on, it places a reverse voltage across the controlled rectifier SCR1 so that the controlled rectifier SCR1 is turned off as indicated in FIGURE 2(c) at the time $t_3$. This condition of the alternating current voltage adding to the direct current voltage $e_1$ continues until the time $t_0'$ when the AC input signal reverses polarity so that the dotted end of the transformer secondary becomes positive. Since the controlled rectifier SCR2 is still conducting, the alternating current voltage opposes or subtracts from the direct current voltage $e_1$. This is the condition initially assumed at the time $t_0$.

The operation just described continues as shown in FIGURE 2. FIGURE 2(b) shows that each of the inserted portions of the alternating current voltage varies about the direct current voltage $e_1$, but that it remains above this voltage $e_1$ for a greater period of time than below. In other words, the area above the voltage $e_1$ is greater than the area below. This causes the average direct current voltage $e_0$ to have an increased magnitude. This increased magnitude is the result of the pulse angle $\alpha$ being less than 90° with respect to the alternating current wave of FIGURE 2(a). This angle $\alpha$ is made smaller by advancing the phase of the pulses produced on the pulse bus 19. And this phase advance is produced by increasing the charge rate of capacitor 30 (by decreasing the control signal applied to transistor 32) so that a pulse is produced earlier. The direct current bus 25 goes to zero at each zero point in the alternating current wave to provide a reference point from which the capacitor 30 may be charged. The pulse generating circuit has a certain degree of automatic protection provided by the fact that at the end of each half cycle of the alternating current voltage, the voltage between the bases of the unijunction transistor 27 goes to zero so that synchronization of the pulse generating circuit with the alternating current wave is insured. The time at which the capacitor 30 receives sufficient charge is determined in part by the control signal applied to the transistor 32.

The operation of the voltage regulator can be expressed mathematically as follows:

$$e_0 \text{ (avg.)} = \frac{1}{\pi}\int_0^\pi e_1 \cdot d\theta + \frac{1}{\pi}\int_0^\alpha -E_m \sin \theta \cdot d\theta + \frac{1}{\pi}\int_\alpha^\pi E_m \sin \theta \cdot d\theta$$

(Equation 1)

In Equation 1, $e_0$ is the average direct current voltage applied to the load 11, $e_1$ is the direct current source voltage to be regulated, $\theta$ is the angle of the alternating voltage at any time $t$, $E_m$ is the voltage magnitude across each of the secondary windings 15, 16, and $\alpha$ is the phase displacement relative to the AC input wave at which a pulse is produced. If Equation 1 is integrated between the limits shown, the following expression is obtained:

$$e_0 \text{ (avg.)} = e_1 + \frac{2 \cdot E_m}{\pi} \cdot \cos \alpha$$ (Equation 2)

Equation 2 is simplified by the following expression:

$$e_0 \text{ (avg.)} = e_1 + .9 \cdot E_{rms} \cdot \cos \alpha$$

(Equation 3)

In Equation 3, $E_{RMS}$ is the RMS voltage across each of the windings 15, 16.

From Equation 3, it will be seen that the average output direct current voltage $e_0$ is equal to the direct current voltage $e_1$ plus an inserted, variable voltage, this variable voltage depending on the angle $\alpha$. If the angle $\alpha$ is less than 90°, the variable voltage is positive and the average voltage $e_0$ is increased. This is the condition represented by FIGURE 2. If the angle $\alpha$ is equal to 90°, then the variable voltage is zero and the average voltage $e_0$ is equal to the direct current voltage $e_1$. But if the angle $\alpha$ is between 90° and 180°, the variable voltage is negative and the average voltage $e_0$ is decreased. The amount of the positive or negative variable voltage depends on the magnitude of the angle $\alpha$.

FIGURE 3 shows the waveforms for the neutral condition where the angle $\alpha$ is equal to 90°. The operation is similar to the operation described for FIGURE 2. In FIGURE 3(b), it will be seen that the areas above and below the direction current voltage $e_1$ are equal so that the average output direct current voltage $e_o$ remains the same. This agrees with Equation 3 for the condition when the angle $\alpha$ is 90° and the variable voltage is zero.

FIGURE 4 shows the waveforms for the buck condition where the angle $\alpha$ is somewhere between 90° and 180°. The operation is similar to the operation described for FIGURE 2. In FIGURE 4(b), it will be seen that the area below the direct current voltage $e_1$ is greater than the area above the direct current voltage $e_1$. This causes the average output direct current voltage $e_o$ to be decreased. This agrees with Equation 3 where the variable voltage is negative since the cosine of an angle between 90° and 180° is negative.

The explanation thus far has neglected the commutating reactance of the transformer 12. FIGURE 5 shows the effect of this reactance for the buck or subtractive condition where the angle $\alpha$ lies between 90° and 180°. This reactance is also present for other angles. At the instant a pulse is produced on the pulse bus 19 at the angle $\alpha$, the AC voltage is reduced to zero, since both controlled rectifiers SCR1, SCR2 are conducting. At a subsequent time corresponding to the electrical angle $\mu$, the previously conducting controlled rectifier ceases conduction. This angle $\mu$ corresponds to the interval required to switch the load current through the transformer winding reactance. The angle $\mu$ may vary, depending on the transformer reactance and frequency of the alternating current. As $\mu$ increases, the zero magnitude of the selected portion of the inserted alternating current increases; and as $\mu$ decreases, the zero magnitude of the selected portion of the inserted alternating current decreases. At the time corresponding to the angles $\alpha$ plus $\mu$, switching is complete, and the previously nonconducting controlled rectifier is the only rectifier conducting. In the operation of the circuit, a sufficient angle $\delta$ must be allowed in order to permit the controlled rectifier just turned off to regain its forward blocking capability so that it will not be turned on as forward voltage is reapplied. This is necessary in order to maintain control. The angle $\delta$ should be sufficient to allow a time of about 30 microseconds to permit the off-going controlled rectifier recover its blocking capability.

FIGURE 6 shows a block diagram of the voltage regulator of the invention as used in an inverter system. The direct current voltage source 10 is coupled to the voltage regulator 40. The voltage regulator 40 represents the circuit shown in FIGURE 1. The regulator 40 produces regulated direct current voltage which is applied to a static inverter 41, which is the load 11 in FIGURE 1. The alternating current output of the static inverter 41 is coupled to an output transformer 42. A suitable alternating current voltage is derived from the output transformer 42 and fed back to the voltage regulator 40. This alternating current voltage corresponds to the AC input shown in FIGURE 1. The alternating current output of the transformer 42 is coupled to a load and is also coupled to a feedback circuit 43 which produces a suitable direct current control signal. This control signal has a magnitude indicative of the relative magnitudes of the alternating current output voltage and a reference voltage. If the alternating current output voltage increases, the control signal magnitude increases. If the alternating current output voltage decreases, the control signal magnitude decreases. The control signal is fed back to the voltage regulator 40, and increases the angle $\alpha$ (that is, retards the phase of the pulses) if the alternating current voltage magnitude is too high, and decreases the angle $\alpha$ (that is, advances the phase of the pulses) if the alternating current output voltage is too low. Other uses for the voltage regulator besides the system shown in FIGURE 6 can, of course, be used.

It will thus be seen that the invention provides a new and improved voltage regulator for direct current voltages. While only one embodiment has been shown and described, modifications will occur to persons skilled in the art. For example, other current control devices can be used. The AC input may be a square wave instead of a sine wave. Also, a multiphase alternating current source can be used with suitable circuits for each phase of the source. Also, other pulse generating circuits, such as a magnetic amplifier, can be used to turn on the current control devices. Therefore, while the invention has been described with reference to a particular embodiment, it is to be understood that modifications may be made without departing from the spirit of the invention or from the scope of the claims.

What we claim as new and desire to secure by Letters Patent of the United States is:

1. A buck and boost voltage regulator comprising a source of alternating voltage, a source of direct voltage, a pair of current control devices coupling the sources of voltage to a load, one of said current control devices being enabled by the positive half cycles of said alternating voltage and the other being enabled by the negative half cycles, control means coupled to each of said current control devices to trigger in each half cycle the enabled current control device into conduction early in the half cycle of said alternating voltage when the output voltage of said voltage regulator is below a desired level, to trigger said enabled current control device late in the half cycle when the output voltage is above said desired level and to trigger said enabled current control device at the midpoint of said half cycle when the output voltage is at the desired level, whereby early firing of said current control devices causes said alternating voltage to add to said direct voltage, late firing causes said alternating voltage to subtract from said direct voltage and midpoint firing causes said alternating voltage to add and subtract equally from said direct voltage.

2. A voltage regulator for a direct current source to be supplied to a load comprising source of alternating voltage, first and second current control devices respectively coupled in first and second parallel paths between said direct current source and said load, means coupling said source of alternating voltage to said first and second parallel paths in opposite voltage relations so that rectified alternating voltage is applied to said load, and means for selectively and alternately rendering said first and second current control devices respectively conductive and nonconductive early in a half cycle of said alternating voltage to apply direct voltage and a portion of said rectified alternating voltage which is positive with respect to said direct voltage to said load when the output of said voltage regulator is below a desired level, late in a half cycle of said alternating voltage to apply direct voltage and a portion of rectified alternating voltage which is negative with respect to said direct voltage to said load when the output of said voltage regulator is above a desired level, and midpoint in a half cycle of said alternating voltage to apply direct voltage and rectified alternating voltage equally positive and negative with respect to said direct voltage to said load when the output of said voltage regulator is at said desired level.

3. A buck and boost voltage regulator for a D.C. source to be applied to a load comprising a source of A.C., a pair of controlled rectifying devices, means coupling the sources of A.C. and D.C. to said pair of controlled rectifying devices, control means coupled to each of said controlled rectifying devices to alternately trigger one controlled rectifying device into conduction during each half cycle of said A.C. to apply D.C. and rectified portions of said A.C. to said load, feedback means coupled to said load and to said control means to apply a control signal to said control means indicative of the deviation of the voltage at the load from a desired voltage, said control means advancing the firing of the controlled rectifying devices within a half cycle of said alternating voltage to increase the direct voltage applied to the load when said control signal indicates the voltage at the load is less than the desired voltage, retarding the firing of the controlled rectifying devices to the midpoint of the half cycle when said control signal indicates zero deviation of the load voltage from the desired voltage, and further retarding the firing to decrease the direct voltage applied to the load when said control signal indicates the voltage at the load is greater than the desired voltage.

4. A buck and boost voltage regulator as recited in claim 3 wherein said control rectifying devices are silicon controlled rectifiers, the anodes of said silicon controlled rectifiers being coupled to said sources of A.C. and D.C., the cathodes being coupled to said load and the control electrodes being coupled to said control means.

5. A buck and boost voltage regulator as recited in claim 4 wherein the means for coupling the sources of A.C. and D.C. to the silicon controlled rectifiers includes a transformer having a primary winding coupled to said source of A.C. and a center-tapped secondary winding being coupled at the center tap to the source of D.C. and to the anode of each silicon controlled rectifier at the ends thereof.

6. A buck and boost voltage regulator as recited in claim 5 wherein said control means is a time controlled pulse generator including means responsive to said control signal to advance and retard the pulse produced by the control means during each half cycle in proportion to the amplitude of said control signal, and synchronization means coupled to said source of A.C. to reset the pulse generator each time the A.C. goes through the zero crossover point.

7. A buck and boost voltage regulator for regulating the direct voltage applied to a load comprising a source of alternating voltage, a pair of controlled rectifiers coupled to said load, inductive means coupling said direct voltage and said alternating voltage to the pair of controlled rectifiers such that each controlled rectifier conducts current from said inductive means to said load in the same direction, and control means responsive to a signal indicative of the output voltage of said voltage regulator coupled to each controlled rectifier to trigger during each half cycle of said alternating voltage the nonconducting controlled rectifier into conduction early in the half cycle to have the rectified alternating voltage boost the direct voltage when said signal is less than a desired value, to trigger late in the half cycle to have the rectified alternating voltage buck the direct voltage when said signal is greater than a desired value and to trigger at the midpoint in the half cycle to have the rectified alternating voltage equally buck and boost the direct voltage when said signal is equal to said desired value.

References Cited

UNITED STATES PATENTS

| | | | |
|---|---|---|---|
| 3,281,654 | 10/1966 | Reinert | 323—45 |
| 3,231,751 | 1/1966 | Bates | 307—2 |
| 3,201,683 | 8/1965 | Hjermstad | 323—45 |
| 3,199,018 | 8/1965 | Macklem | 323—45 |
| 3,129,380 | 4/1964 | Lichowsky | 323—45 |

ORIS L. RADER, *Primary Examiner.*

H. HUBERFELD, *Assistant Examiner.*